United States Patent
Hackett (10) Patent No.: US 11,023,269 B2
(45) Date of Patent: *Jun. 1, 2021

(54) WORKLOAD MANAGER CONTROL OF DYNAMIC THREAD MODE SWITCH

(71) Applicant: INTERNATIONAL BUSINESS MACHINES CORPORATION, Armonk, NY (US)

(72) Inventor: Charles E. Hackett, Greenlawn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,352

(22) Filed: Aug. 21, 2019

(65) Prior Publication Data
US 2019/0377595 A1    Dec. 12, 2019

Related U.S. Application Data

(63) Continuation of application No. 15/826,763, filed on Nov. 30, 2017, now Pat. No. 10,713,075.

(51) Int. Cl.
*G06F 9/455*   (2018.01)
*G06F 9/50*    (2006.01)

(52) U.S. Cl.
CPC ...... *G06F 9/45558* (2013.01); *G06F 9/45533* (2013.01); *G06F 9/5044* (2013.01);
(Continued)

(58) Field of Classification Search
CPC ............. G06F 9/45558; G06F 9/45533; G06F 9/5044; G06F 9/5077; G06F 2009/45595; G06F 2009/5022
See application file for complete search history.

(56) References Cited

U.S. PATENT DOCUMENTS

| | | | | |
|---|---|---|---|---|
| 8,327,368 | B2* | 12/2012 | Mall ..................... | G06F 9/3851 |
| | | | | 718/102 |
| 8,458,709 | B2* | 6/2013 | Armstrong ............ | G06F 9/4812 |
| | | | | 718/102 |

(Continued)

OTHER PUBLICATIONS

Anonymous "A System and Method for Smart Workload Management on Asymmetric Multicore Architectures", ip.com, ip.com No. IPCOM000236928D; May 22, 2014, pp. 1-7.

(Continued)

*Primary Examiner* — Diem K Cao
(74) *Attorney, Agent, or Firm* — Cantor Colburn LLP; William Kinnaman (57) ABSTRACT

Embodiments include method, systems and computer program products for operating a computer system using a workload manager to control a dynamic thread mode switch. The method includes receiving a plurality of workloads. A workload manager determines which of the plurality of workloads are eligible to use a processor core operating in a multi-threaded mode and which workloads are response sensitive and use a processor core operating in a single-thread mode. A hypervisor determines a state of operation for one or more cores of one or more processors and causes a core switch for at least one or more cores in response to a determination that workloads eligible to use a processor core operating in a multi-threaded mode exist or workloads that are response sensitive and a determination that the state of operation for one or more cores of one or more processors should change to facilitate handling the associated workloads.

18 Claims, 5 Drawing Sheets

(52) U.S. Cl.
CPC .. *G06F 9/5077* (2013.01); *G06F 2009/45595* (2013.01); *G06F 2209/5022* (2013.01)

(56) References Cited

U.S. PATENT DOCUMENTS

| | | | |
|---|---|---|---|
| 8,621,459 | B2 | 12/2013 | Levit-Gurevich et al. |
| 8,898,434 | B2 | 11/2014 | Merchant et al. |
| 9,158,355 | B2 * | 10/2015 | Sutardja .............. G06F 9/30189 |
| 9,619,284 | B2 | 4/2017 | Sakarda |
| 9,720,730 | B2 | 8/2017 | Glazburg et al. |
| 2004/0216102 | A1 | 10/2004 | Floyd |
| 2015/0277985 | A1 | 10/2015 | Abraham et al. |
| 2016/0091882 | A1 * | 3/2016 | Ludwig ................ G05B 19/056 700/86 |
| 2019/0095231 | A1 | 3/2019 | Patel et al. |
| 2019/0163512 | A1 | 5/2019 | Hackett |

OTHER PUBLICATIONS

Anonymous "Method and System for Automatically Resolving Inter-Thread Conflicts in Simultaneous Multithreading (SMT) Environment", ip.com, ip.com No. IPCOM000237736D; Jul. 8, 2014, p. 1-2.

Anonymous "Trace-Core Processors", ip.com, ip.com No. IPCOM000199882D; Sep. 20, 2010, pp. 1-17.

Hughes, Clay et al.,"Accelerating Multi-core Processor Design Space Evaluation Using Automatic Multi-threaded Workload Synthesis," IEEE XPLORE, Sep. 30, 2008, p. 1-10.

IBM "Method to improve response time for threads running in a multithreaded environment", ip.com, ip.com No. IPCOM000189111D; Oct. 28, 2009, pp. 1-3.

IBM "List of IBM Patents or Patent Applications Treated As Related"; Date Filed: Aug. 21, 2019, 2 pages.

Vera Javier et al.,"Measuring the Performance of Multithreaded Processors", Research Gate, 2007, p. 1-6.

* cited by examiner

Workload manager pseudo code
SteadyState:
on Entry:
        wait for timed event,
        OR wait for hypervisor interrupt
        OR wait for own service-level-fail interrupt if timed event then do,
        if there is any reason to switch a core to multi thread mode,
        AND is not blocked by self constraint
        AND is not blocked by other partition veto,
        AND is not blocked by analysis of history,
        then,
        ask hypervisor for core switch to multi thread mode
end else if hypervisor interrupt event then do,
        if signaled to return to single thread mode then,
                perform actions in preparation for mode switch
        else if signal is permission to allow other partition more
                multi thread mode cores then,
                if this partition will not be impacted,
                      return ALLOW
                else
                      return VETO
        end else if this partition service-level-fail event then do,
        if this image use of multi threaded cores is cause,
                signal hypervisor that a core switch to single thread mode is required
        else ask hypervisor if other partition use of multi-threaded core is the cause then,
                signal hypervisor to reduce other partition
end

WORKLOAD MANAGER CONTROL OF DYNAMIC THREAD MODE SWITCH

DOMESTIC PRIORITY

This application is a continuation application of the legally related U.S. Ser. No. 15/826,763 filed Nov. 30, 2017, the contents of which are incorporated by reference herein in their entirety.

BACKGROUND

The present invention relates to user interaction within a programming environment for a computing device, and more specifically, to a programming environment that allows writing to portions of memory and designating the portions of memory as read-only wherein the portions can be reset to enable read and write operations.

Computer systems, processors, caches, I/O device and other devices in the computer architecture access data in memory using one or more memory controllers. The processors can be general purpose and include multiple cores and/or employ simultaneous multi-threading.

Computers systems can utilize an operating system ("OS") as an interface between their applications and the computer hardware. A workload manager usually manages application programs executing on the computer which can be used to manage workloads. A workload is a computing task that exists with a discrete, isolated and detached set of application logic (with specific policies, rules and behavioral characteristics that can be executed independently.

SUMMARY

Embodiments of the invention are directed to a method for operating a computer system using a workload manager to control a dynamic thread mode switch. A non-limiting example of the computer-implemented method includes receiving, by the computer system, a plurality of workloads. A workload manager determines which of the plurality of workloads are eligible to use a processor core operating in a multi-threaded mode and which workloads are response sensitive and should use a processor core operating in a single-thread mode. A hypervisor determines a state of operation for one or more cores of one or more processors of the computer system. The hypervisor causes a core switch for at least one or more cores of one or more processors in response to a determination that workloads eligible to use a processor core operating in a multi-threaded mode exist or workloads that are response sensitive exist and a determination that the state of operation for one or more cores of one or more processors should change to facilitate handling the associated workloads. The one or more cores of one or more processors of the computer system handle the plurality of workloads.

Embodiments of the invention are directed to a computer program product that can include a storage medium readable by a processing circuit that can store instructions for execution by the processing circuit for performing a method for operating a computer system using a workload manager to control a dynamic thread mode switch. A non-limiting example of the method includes receiving, by the computer system, a plurality of workloads. A workload manager determines which of the plurality of workloads are eligible to use a processor core operating in a multi-threaded mode and which workloads are response sensitive and should use a processor core operating in a single-thread mode. A hypervisor determines a state of operation for one or more cores of one or more processors of the computer system. The hypervisor causes a core switch for at least one or more cores of one or more processors in response to a determination that workloads eligible to use a processor core operating in a multi-threaded mode exist or workloads that are response sensitive exist and a determination that the state of operation for one or more cores of one or more processors should change to facilitate handling the associated workloads. The one or more cores of one or more processors handle the plurality of workloads.

Embodiments of the invention are directed to a system. The system includes one or more processors comprising one or more cores in communication with a memory. The system includes a workload manager, wherein the workload manager determines which of the plurality of workloads received by the system are eligible to use a processor core operating in a multi-threaded mode and which workloads are response sensitive and should use a processor core operating in a single-thread mode. The system includes hypervisor that is operable to determine a state of operation for the one or more cores of one or more processors of the computer system and cause a core switch for at least one or more cores of the one or more processors in response to a determination that workloads eligible to use a processor core operating in a multi-threaded mode exist or workloads that are response sensitive exist and a determination that the state of operation for one or more cores of one or more processors should change to facilitate handling the associated workloads. The one or more cores of the one or more processors are operable to handle the plurality of workloads.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems and computer program products for operating a computer system using a workload manager to control a dynamic thread mode switch is described herewith.

Current methods of employing simultaneous multi-threaded (SMT) cores (MTC) on general purpose processors (GPs) in servers/computing environments are a barrier to exploiting SMT operations on GPs. Schemes that operate GPs as all or nothing with regard to the use SMT fail to recognize the heterogeneous mixture of workloads that occur under operating system management.

SMT hardware threads are generally slower than the hardware threads of single-threaded cores (STCs). Accordingly, some high priority workloads should not run on SMT hardware because high priority workloads benefit from the additional speed provided by an STC. In addition, workloads that are response sensitive can require that the server's processor cores operate in a single-threaded mode.

Operating processors in a static fashion, single-threaded or multi-threaded, can be problematic. A static processor configuration cannot respond to workload variations that can occur within a given time period, for example, a business day.

In situations where too many cores of a processor operate in an SMT mode, workload performance for high priority workloads can suffer due to a degradation in performance because the demand for single-threaded core processing resources exceeds the supply of single-threaded cores. In situations where too few cores of a processor operate in an SMT mode performance can suffer because the amount of processing capacity to address existing workloads are not sufficient.

Accordingly, having processors/cores that can dynamically switch between single and multi-thread mode in order to address workloads and associated workload variations over a given time period, would be beneficial. This can be especially useful when workloads are operating in a computing environment having shared processing resources.

Turning now to an overview of aspects of the present invention, one or more embodiments of the invention provide methods, systems, structures and computer program products configured to operate a computer system using a workload manager to control a dynamic thread mode switch. The workload manager can employ a workload manager policy (i.e., user-defined controls, a multi-image wide service policy) which can be used to control the number of cores operating in a multi-threaded mode and under what conditions cores switch dynamically between a single-threaded mode and a multi-threaded mode. Accordingly, workloads that are high priority workloads can take advantage of cores that operate in a single-threaded mode, which provide a higher instruction throughput rate, and medium/low priority workloads can take advantage of cores operating in a multi-threaded mode in which cores provide higher overall system capacity but the individual hardware threads operate at a lower instruction throughput rate.

Figure 1:
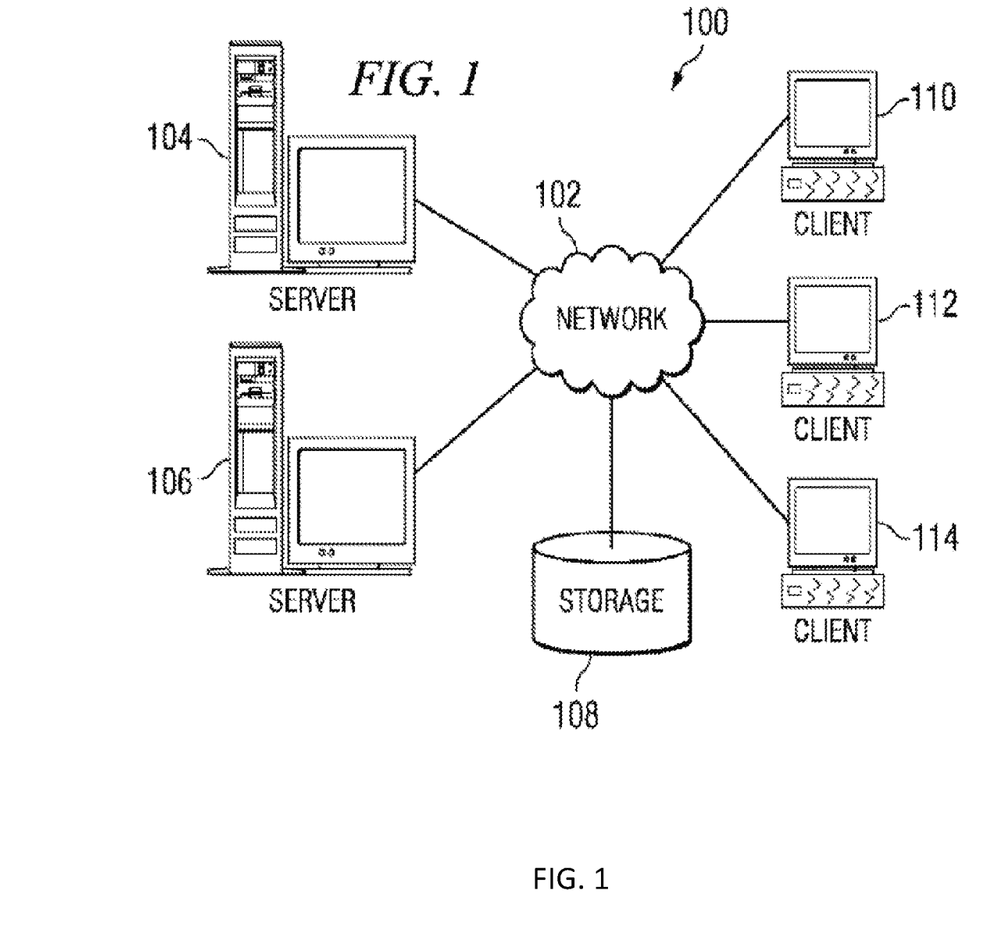
FIG. 1 is an exemplary diagram of a distributed data processing system in which exemplary aspects of the present invention may be implemented.

With reference now to the figures, FIG. 1 depicts a pictorial representation of an exemplary distributed data processing system in which aspects of the illustrative embodiments of the present invention may be implemented. Distributed data processing system 100 may include a network of computers in which instances of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
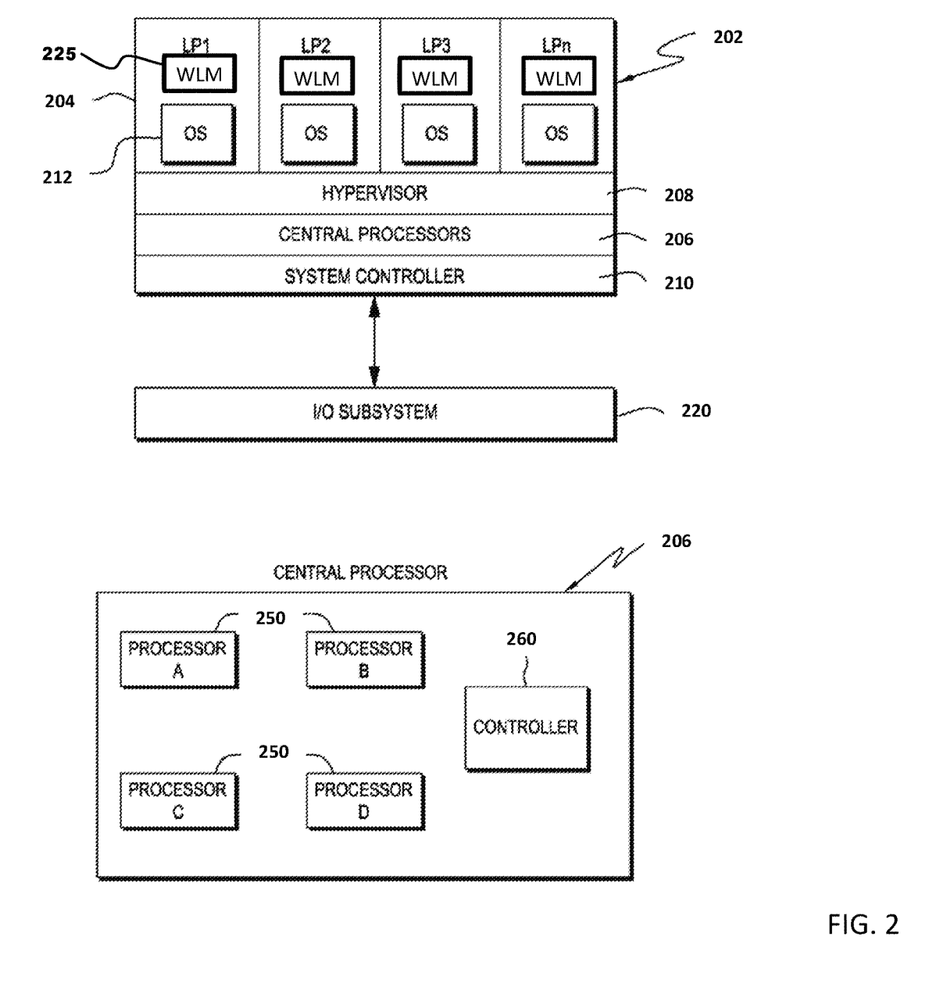
FIG. 2 is a block diagram illustrating a block diagram of an exemplary computing environment is shown in which aspects of the exemplary embodiments of the present invention may be implemented.

With reference now to FIG. 2, a block diagram of an exemplary computing environment is shown in which aspects of the exemplary embodiments of the present invention may be implemented. Computing environment 202 includes, for instance, one or more partitions 204 (e.g., logical partitions LP1-LPn), one or more central processors 206, a hypervisor 208 (e.g., a logical partition manager), and a system controller 210, which are coupled to an input/output (I/O) subsystem 220.

Each logical partition 204 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

Each logical partition 204 has a resident operating system (OS) 212, which may differ for one or more logical partitions. Each logical partition 204 includes a workload manager (WLM) 225. The WLM 225 can optimize the distribution of work and associated data within the logical partition 204. The WLM 225 can also maintain a history of workload usage and core switch events so that the WLM 225 can anticipate when a core switch event is needed. For example, WLM 225 can balance workloads in accordance with user-specified business-oriented goals, such as transaction response times and batch run times for critical batch jobs. Such workload balancing generally entails software performance monitoring to gather information regarding resource usage and performance in each logical partition 204. Utilizing this performance information, the WLM 225 can manage thread dispatch priorities and the use of memory and other resources in order to achieve the user-specified objectives for handling all of the current workloads. Each WLM 225 in computing environment 202 can communicate with other WLMs via hypervisor 208.

Each logical partition 204 includes one or more logical processors. Each logical processor may have a central processor 206 allocated thereto, or there may be a pool of central processors 206 available for dynamic allocation to any group of logical processors, possibly spanning multiple logical partitions 204.

Logical partitions 204 are managed by hypervisor 208 implemented, for instance, by firmware running on central processors 206. Logical partitions 204 and hypervisor 208 each comprise one or more programs residing in respective portions of main storage associated with an associated central processor 206.

Central processors 206 can be coupled to system controller 210. System controller 210 is, for example, a hardware component that controls access to memory and caches within the central processors 206, and communicates between the central processors 206 and I/O subsystem 220. The system controller 210 is responsible for the queuing, serialization, and execution of requests made by the central processors 206 and the I/O subsystem 220. The system controller 210 may be a centralized component or its functions may be distributed. The system controller 210 operates as a communications mechanism between the I/O subsystem 220 and the central processors 206.

Each central processor 206 can include processors 250, which are the physical processors that are allocated to one or more logical partitions. Each central processor 206 can also include one or more cores. A central processor 206 is considered part of a node, and each node includes one or more central processors 206. Logical partition 204 can span nodes in which one or more central processors 206 from one node and one or more central processors 206 from another node can be assigned to the logical partition 204.

Each central processor 206 can include a controller 260 (e.g., hardware controller) used to monitor the processors, and in particular, the threads executing on the processors. Each of the one or more cores and/or processors 250 can be dynamically configured to operate in a simultaneous multithreading (SMT) mode or a non-simultaneous multithreading mode, also referred to as single-threaded mode.

Figure 3:
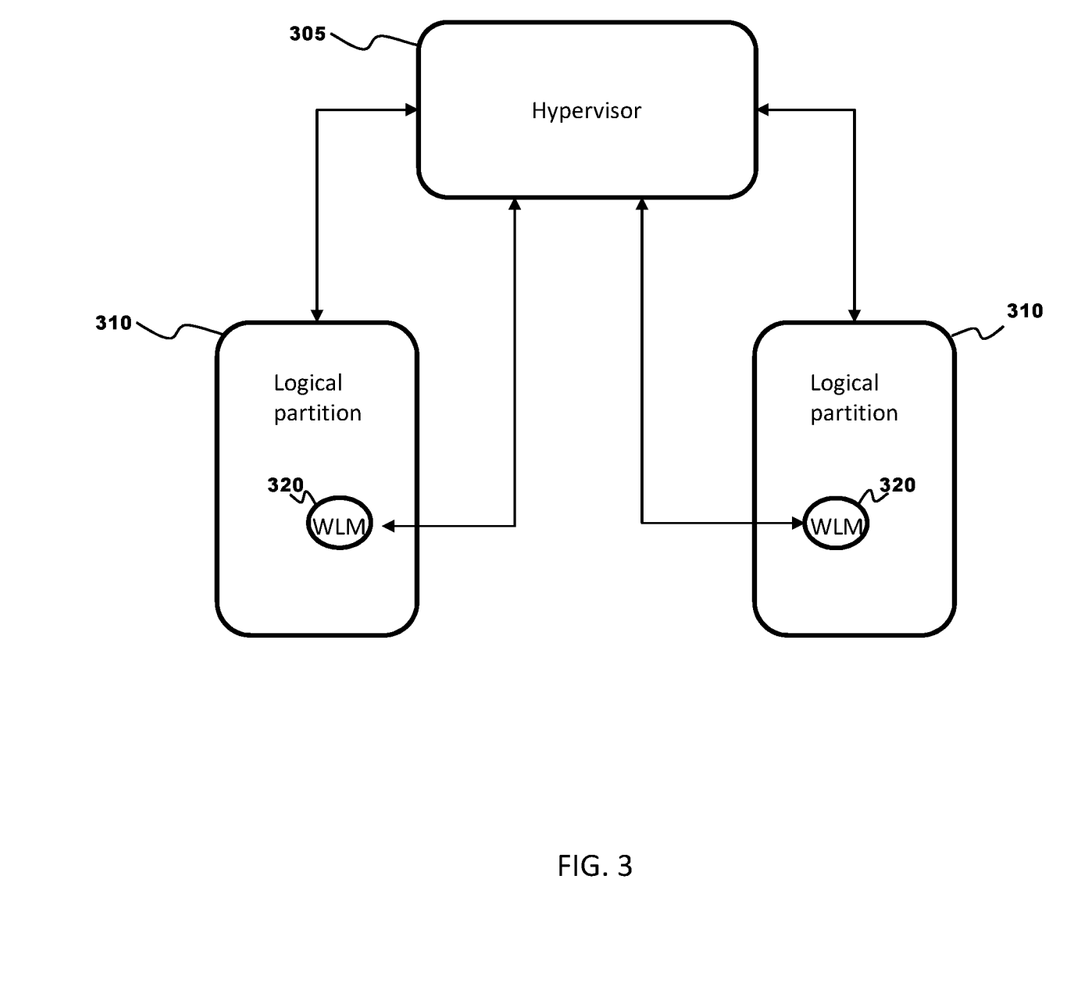
FIG. 3 is a block diagram illustrating an interaction between components of an exemplary computing environment is shown in which aspects of the exemplary embodiments of the present invention may be implemented.

With reference now to FIG. 3, a block diagram illustrating an interaction between components of an exemplary computing environment is shown in which aspects of the exemplary embodiments of the present invention may be implemented. For example, the interaction can occur when one or more programmers utilize any of clients 110, 112 and 114 to collaborate with one or more cores and/or processors associated with server 104 and/or server 106. Logical partitions 310 operate in conjunction with hypervisor 305. The hypervisor 305 can act as a controlling master for the subordinate logical partitions. A workload manager (WLM) 320 operating within the logical partition 310 can signal through the hypervisor 305 to other cohosted logical partitions 310 that a core switch event (e.g., switching from a single-thread mode to multi-thread mode) is desired. Each logical partition 310 can respond with an indication (vote) of whether to proceed with the core switch event. Core switch event requests can occur independently from workload demands.

The WLM 320 can implement a user-defined workload policy which can define which conditions can trigger a core switch event. The workload policy can describe what workloads are eligible to run on a multi-threaded core. A reason to operate a core in a multi-thread mode instead of a single-thread mode can be the result of a need for more capacity due to CPU resource demand pressure initiated by multi-thread eligible workloads.

The workload policy can control which of a plurality of cores can switch to multi-thread mode. Accordingly, the workload policy can act as a governor that can limit the number of cores operating multi-thread mode.

When the hypervisor 305 receives a request to switch a core's state, the hypervisor 305 can broadcast the request to all other cohosted logical partitions 310 to obtain consensus approval. Any logical partition 310 can block/veto the request.

Reasons to block/veto a request by a logical partition 310 can include: not having enough cores available to be switched to multi-thread mode (policy controlled); a service objective for response sensitive workloads (non-multi-thread mode eligible) is unmet, and reducing single-threaded cores will only exacerbate the problem; should the hypervisor use a scheme that dedicates a multi-threaded core to a single partition, removing cores from the set of single-threaded cores may reduce the capacity for non-participating partitions which would cause them to veto the switch event request; analysis of workload performance and resource usage history shows that the demand driving a request for a core switch to multi-thread mode is most likely temporary; and analysis of history shows that service objectives are expected to fail if the core switch event occurs.

A core switch event can be multi-stage action. Logical partitions 310 can respond to the hypervisor 305 signaling that a core switch event is due to occur by managing an associated set of logical processors. Once all participating logical partitions 310 are prepared, the hypervisor 305 can trigger a core thread mode switch based on the core switch event. Each logical partition 310 is then signaled for approval to conduct the core thread mode switch. Any actions subordinate to the logical partition 310 at an OS level are controlled by the logical partition 310.

Logical partition guaranteed capacity portions after a core switch event can be adjusted to reflect the capacity change to the system.

For example, a workload policy for medium/low priority workloads that can benefit from additional resources can trigger a core switch event causing an associated core to dynamically switch to a multi-thread mode. High priority workloads that can benefit from a higher instruction throughput rate can trigger a core switch event causing the associated core to dynamically switch back to operating as a single-threaded mode.

Reasons to dynamically switch back to operating in a single threaded mode from a multi-threaded mode can include: demand from multi-thread mode eligible workloads subside; service objectives for workloads that are non-multi-thread mode eligible are unmet and additional cores operating as single-threaded cores can help resolve demand; analysis of a switching history or a workload policy threshold shows that a resource demand spike is anticipated for non-multi-thread mode eligible workloads and a logical partition needs to be adjusted to meet the demand; and another logical partition on the computer system needs core operating in a multi-thread mode to return to a single-threaded mode.

Because the core switch event and OS reconfigurations are relatively heavy weight operations, a thrashing condition can be avoided by not switching to multi-thread mode and immediately back to single thread mode. The logical partition 310 can be used to prevent a thrashing condition.

Figure 4:
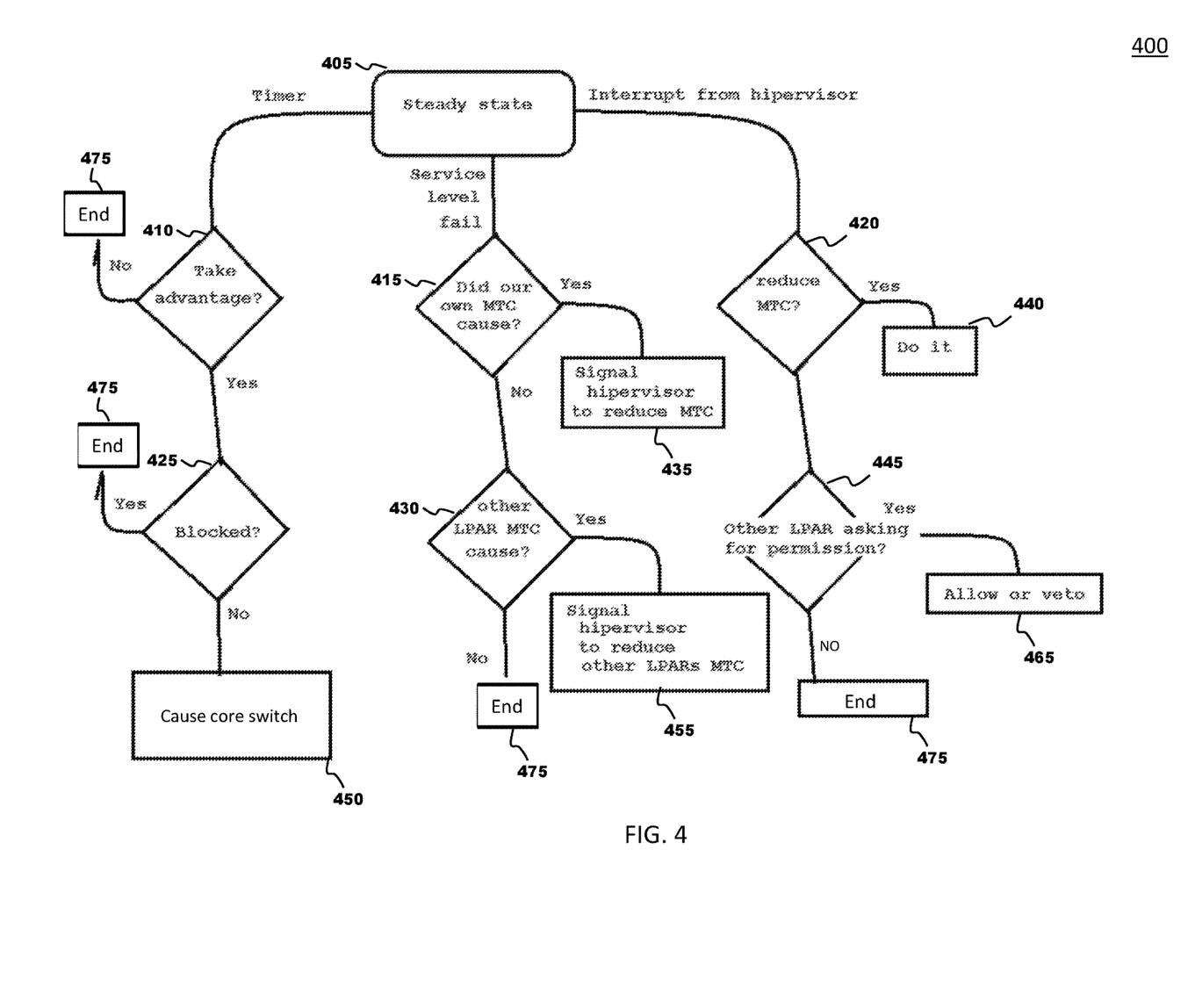
FIG. 4 is a flow diagram illustrating a method for operating a computer system using a workload manager to control a dynamic thread mode switch according to one or more embodiments of the present invention.

FIG. 4 is a flow diagram 400 illustrating a computer-implemented method of operating a computer system using a workload manager to control a dynamic thread mode switch according to one or more embodiments of the present invention. After starting at block 405, a computer system exists at a steady-state where the computer system is monitored to determine whether a core switch event (i.e., timer, service objective fail, interrupt or the like) has been triggered. When a timer triggers a core switch event (e.g., a switch from single-threaded mode to multi-threaded mode), the computer-implemented method proceeds to block 410 where the computer system determines whether switching at least one core to a multi-threaded mode would be beneficial based on a current workload and/or future anticipated workload. The timer can be associated with a constant value or a time range dependent on overall system activity or some other criteria, which is defined by a service policy. For example, a time period associated with the timer trigger can be, for example, every 2 minutes. If a core switch would not be beneficial, the computer-implemented method proceeds to block 475 where the method ends. If a core switch would be beneficial, the computer-implemented method proceeds to block 425 where a determination of whether the core switch should be blocked occurs. For example, a core switch can be blocked by the logical partition in which the core has been allocated, by other logical partitions associated with the computer system, or in response to an analysis of switching history. If a core switch is blocked, the computer-implemented method proceeds to block 475 where the method ends. If a core switch is not blocked, the computer-implemented method proceeds to block 450 where a hypervisor managing the logical partition associated with the core to be switched causes a core switch, for example, a core switch from single-threaded mode to multi-threaded mode.

When a service objective fail triggers a core switch event, the computer-implemented method proceeds to block 415 where the computer system determines whether the service objective fail was caused by operating one or more cores of a logical partition in a multi-threaded mode. If the service objective fail was caused by operating one or more cores of a logical partition in a multi-threaded mode, the computer-implemented method proceeds to block 435, where the hypervisor managing the logical partition associated with the one or more cores causes at least one of the one or more cores to perform a core switch from multi-threaded mode to single threaded mode. If the service objective fail was not caused by operating one or more cores of a logical partition in a multi-threaded mode, the computer-implemented method proceeds to block 430, where the computer system can determine whether one or more cores of other logical partitions associated with the computer system have caused the service objective fail by operating one or more cores in a multi-threaded mode. If the one or more cores of other logical partitions associated with the computer system have not caused the service objective fail, the computer-implemented method proceeds to block 475 where the method ends. If the one or more cores of other logical partitions associated with the computer system have caused the service objective fail, the computer-implemented method proceeds to block 455 where the hypervisor managing the other logical partitions associated with the one or more cores that caused the service objective fail causes at least one of the one or more cores to perform a core switch from multi-threaded mode to single threaded mode.

When an interrupt from the hypervisor triggers a core switch event, the computer-implemented method proceeds to block 420 where the computer system determines whether a reduction of cores operating in a multi-threaded mode should occur. If a reduction of cores operating in a multi-threaded mode should occur, i.e., beneficial to the operation of the computer system, the computer-implemented method proceeds to block 440, where the hypervisor managing the logical partition associated with the one or more cores operating in a multi-threaded mode causes at least one core to switch from multi-threaded mode to single-threaded mode. If a reduction of cores operating in a multi-threaded mode should not occur, the computer-implemented method proceeds to block 445, where the computer system determines whether other logical partitions have made requests to the hypervisor managing the logical partition associated with the one or more cores operating in a multi-threaded mode to reduce cores operating in a multi-threaded mode. If other logical partitions have made requests, the computer-implemented method proceeds to block 465, where the other logical partitions form a consensus in order to determine whether the request should be allowed or vetoed. If the consensus is to allow a reduction of cores operating in a multi-threaded mode, the hypervisor can cause at least one core to switch from multi-threaded mode to single-threaded mode. If the consensus is to veto the reduction of cores operating in a multi-threaded mode, the hypervisor will maintain the cores operating in multi-threaded mode. If other logical partitions have not made requests, the computer-implemented method proceeds to block 475 where the method ends.

Figure 5:
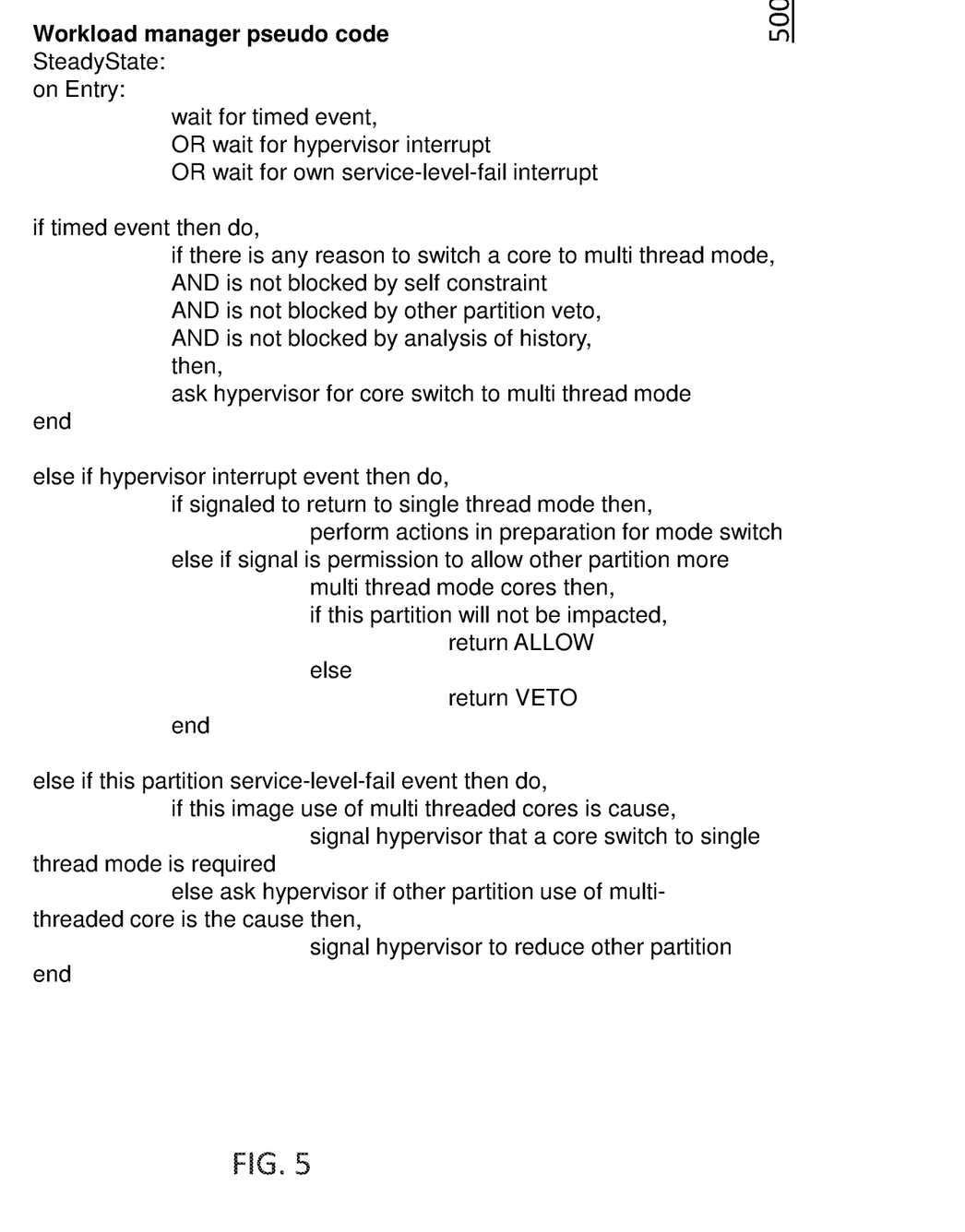
FIG. 5 is an illustration of pseudo-code representing steps for operating a workload manager according to one or more embodiments of the present invention.

FIG. 5 illustrates pseudo-code 500 representing steps for operating a workload manager according to one or more embodiments of the present invention. The pseudo-code 500 can be used to implement the method of operating a computer system using a workload manager to control a dynamic thread mode switch mentioned above with respect to FIG. 4.

Embodiments of the present invention recognize that exclusive use of multi-threaded cores over single-threaded cores can degrade response time, though increases the overall workload throughput rate because of the increased capacity. Response sensitive workloads usually need access to single-threaded cores for best performance. Accordingly, the present invention provides a computer system capable of varying mixes of both response sensitive and throughput oriented workloads by dynamically switching cores between a single-threaded mode and multi-threaded mode to handle the varying workloads.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a computer system using a workload manager to control a dynamic thread mode switch, the method comprising:
    receiving, by the computer system, a plurality of workloads;
    determining, by a workload manager, which of the plurality of workloads are eligible to use a processor core operating in a multi-threaded mode;
    determining, by a hypervisor, a mode of operation for one or more cores of one or more processors of the computer system, wherein the mode includes one of a multi-threaded mode and a single-thread mode;
    causing, by the hypervisor, a core switch for one or more cores of one or more processors in response to: (i) a determination that workloads eligible to use a processor core operating in a multi-threaded mode; and (ii) a determination that the mode of operation for one or more cores of one or more processors should change to facilitate handling the associated workloads; and
    handling, by the one or more cores, the plurality of workloads
    wherein the workload manager maintains a history of workload usage and core switch events.

2. The computer-implemented method of claim 1, wherein the hypervisor also causes a core switch in response to at least one of the following: an expiration of a time period associated with a timer, an interrupt, and a service objective fail.

3. The computer-implemented method of claim 1, wherein the one or more cores are associated with a logical partition.

4. The computer-implemented method of claim 3, wherein one or more other cohosted logical partitions can block a core switch for the one or more cores associated with the logical partition.

5. The computer-implemented method of claim 3, wherein the logical partition prevents a thrashing condition.

6. The computer-implemented method of claim 1, wherein low priority workloads are eligible to use a processor core operating in a multi-threaded mode.

7. The computer-implemented method of claim 1, wherein medium and high priority workloads are workloads that are response sensitive.

8. The computer-implemented method of claim 1, wherein the workload manager can limit an amount of the one or more cores of one or more processors to operate in a multi-threaded mode.

9. A system, comprising:
    one or more processors, wherein each of the one or more processors comprises one or more cores; and
    a memory coupled to the one or more processors;
    a workload manager, wherein the workload manager determines which of a plurality of workloads received by the system are eligible to use a processor core operating in a multi-threaded mode; and
    a hypervisor, wherein the hypervisor is operable to:
        determine a mode of operation for the one or more cores of one or more processors of the system, wherein the mode includes one of a multi-threaded mode and a single-thread mode; and
        cause a core switch for at least one or more cores of the one or more processors in response to: (i) a determination that workloads eligible to use a processor core operating in a multi-threaded mode; and (ii) a determination that the state mode of operation for one or more cores of one or more processors should change to facilitate handling the associated workloads;
    wherein the one or more cores of the one or more processors are operable to handle the plurality of workloads,
    wherein the workload manager maintains a history of workload usage and core switch events.

10. The system of claim 9, wherein the hypervisor also causes a core switch in response to at least one of the following: an expiration of a time period associated with a timer, an interrupt, and a service objective fail.

11. The system of claim 9, wherein the one or more cores are associated with a logical partition.

12. The system of claim 11, wherein one or more other cohosted logical partitions can block a core switch for the one or more cores associated with the logical partition.

13. The system of claim 11, wherein the logical partition prevents a thrashing condition.

14. The system of claim 9, wherein low priority workloads are eligible to use a processor core operating in a multi-threaded mode.

15. The system of claim 9, wherein medium and high priority workloads are workloads that are response sensitive.

16. The system of claim 9, wherein the workload manager uses the history of workload usage and core switch events to anticipate when a core switch should occur.

17. The system of claim 9, wherein the workload manager can limit an amount of the one or more cores of one or more processors to operate in a multi-threaded mode.

18. A computer program product for operating a computer system using a workload manager to control a dynamic thread mode switch, the computer program product comprising:

a non-transitory computer readable storage medium having stored thereon first program instructions executable by a processor to cause the processor to:

receive a plurality of workloads;

determine which of the plurality of workloads are eligible to use a processor core operating in a multi-threaded mode;

determine a mode of operation for one or more cores of one or more processors of the computer system, wherein the mode includes one of a multi-threaded mode and a single-thread mode;

cause a core switch for at least one or more cores of one or more processors in response to: (i) a determination that workloads eligible to use a processor core operating in a multi-threaded mode; and (ii) a determination that the mode of operation for one or more cores of one or more processors should change to facilitate handling the associated workloads; and handle the plurality of workloads, wherein the workload manager maintains a history of workload usage and core switch events.

\* \* \* \* \*